(12) United States Patent
Cranton et al.

(10) Patent No.: US 12,117,611 B2
(45) Date of Patent: Oct. 15, 2024

(54) SYSTEM AND METHOD OF AUGMENTING A HEAD MOUNTED DISPLAY FOR VISION CORRECTION BACKGROUND

(71) Applicant: GOOGLE LLC, Mountain View, CA (US)

(72) Inventors: Brian Watson Cranton, Kitchener (CA); Lloyd Frederick Holland, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 461 days.

(21) Appl. No.: 17/506,021

(22) Filed: Oct. 20, 2021

(65) Prior Publication Data

US 2023/0118615 A1    Apr. 20, 2023

(51) Int. Cl.
| | |
|---|---|
| *G02B 27/00* | (2006.01) |
| *G02B 5/04* | (2006.01) |
| *G02B 13/00* | (2006.01) |
| *G02B 13/24* | (2006.01) |
| *G02B 27/01* | (2006.01) |

(52) U.S. Cl.
CPC ........... *G02B 27/0081* (2013.01); *G02B 5/04* (2013.01); *G02B 13/0095* (2013.01); *G02B 13/24* (2013.01); *G02B 27/0172* (2013.01); *G02B 2027/014* (2013.01); *G02B 2027/0178* (2013.01)

(58) Field of Classification Search
CPC ............ G02B 27/0081; G02B 27/0172; G02B 2027/0178; G02B 27/027; G02B 27/022; G02B 13/0095

See application file for complete search history.

(56) References Cited

U.S. PATENT DOCUMENTS

| | | |
|---|---|---|
| 9,851,565 B1 | 12/2017 | Miao |
| 2017/0343818 A1 | 11/2017 | Espie et al. |
| 2018/0109783 A1 | 4/2018 | Austin et al. |

(Continued)

FOREIGN PATENT DOCUMENTS

| | | |
|---|---|---|
| CN | 113092079 A | 7/2021 |
| KR | 20200106301 A | 9/2020 |
| WO | 2022204029 A1 | 9/2022 |

OTHER PUBLICATIONS

Hong, J. et al., "See-through Optical Combiner for Augmented Reality Head-Mounted Display: Index-Matched Anisotropic Crystal Lens," Scientific Reports, vol. 7, No. 1; Jun. 5, 2017.

(Continued)

*Primary Examiner* — Ryan D Howard

(57) ABSTRACT

A system includes a head-mounted display (HMD) device configured to project digital images to a user's eye and a viewing device. The viewing device includes an optical relay unit having a world-facing surface and an eye-facing surface and a holder coupled to the optical relay unit and configured to support the HMD device near the world-facing surface. The optical relay unit is configured to transmit light projected by the HMD device to an eye-facing aperture disposed at the eye-facing surface of the optical relay. The system shifts an eyebox of the HMD by receiving light projected from an optical combiner of the HMD, transmitting the light through the optical relay unit of the viewing device to the eye-facing aperture of the optical relay unit, and outputting the light from the eye-facing aperture such that the light is focused at an eyebox in which a user's eye is located.

20 Claims, 7 Drawing Sheets

(56) References Cited

U.S. PATENT DOCUMENTS

2018/0180893 A1  6/2018  Gupta et al.
2020/0174284 A1  6/2020  Chan et al.

OTHER PUBLICATIONS

International Search Report and Written Opinion mailed Feb. 24, 2023 for PCT Application No. PCT/US2022/044360, 19 pages.
Jones et al., "The Eye and Near-Field Optics in Hololens and Magic Leap", https://slideplayer.com/slide/13742008/, 11 pages.
International Preliminary Report on Patentability mailed May 2, 2024 for PCT Application No. PCT/US2022/044360, 12 pages.

SYSTEM AND METHOD OF AUGMENTING A HEAD MOUNTED DISPLAY FOR VISION CORRECTION BACKGROUND

BACKGROUND

In the field of optics, a combiner is an optical apparatus that combines two light sources, for example, light transmitted from a micro-display and directed to the combiner via a lightguide, and environmental light. Optical combiners are used in heads up displays (HUDs), examples of which include head-mounted displays (HMDs) or near-eye displays, which allow a user to view computer-generated content (e.g., text, images, or video content) superimposed over a user's environment viewed through the HMD, creating what is known as augmented reality (AR) or mixed reality (MR). In some applications, an HMD is implemented in an eyeglass frame form factor with an optical combiner forming at least one of the lenses within the eyeglass frame. The HMD enables a user to view the displayed computer-generated content while still clearly viewing their environment.

Conventional near-to-eye displays are not well suited for users that require ophthalmic corrective lenses as HMDs can physically interfere with conventional prescription corrective eyeglasses because they are necessarily worn close to a user's eye, thus limiting the vertex distance available for both corrective and HMD display components.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
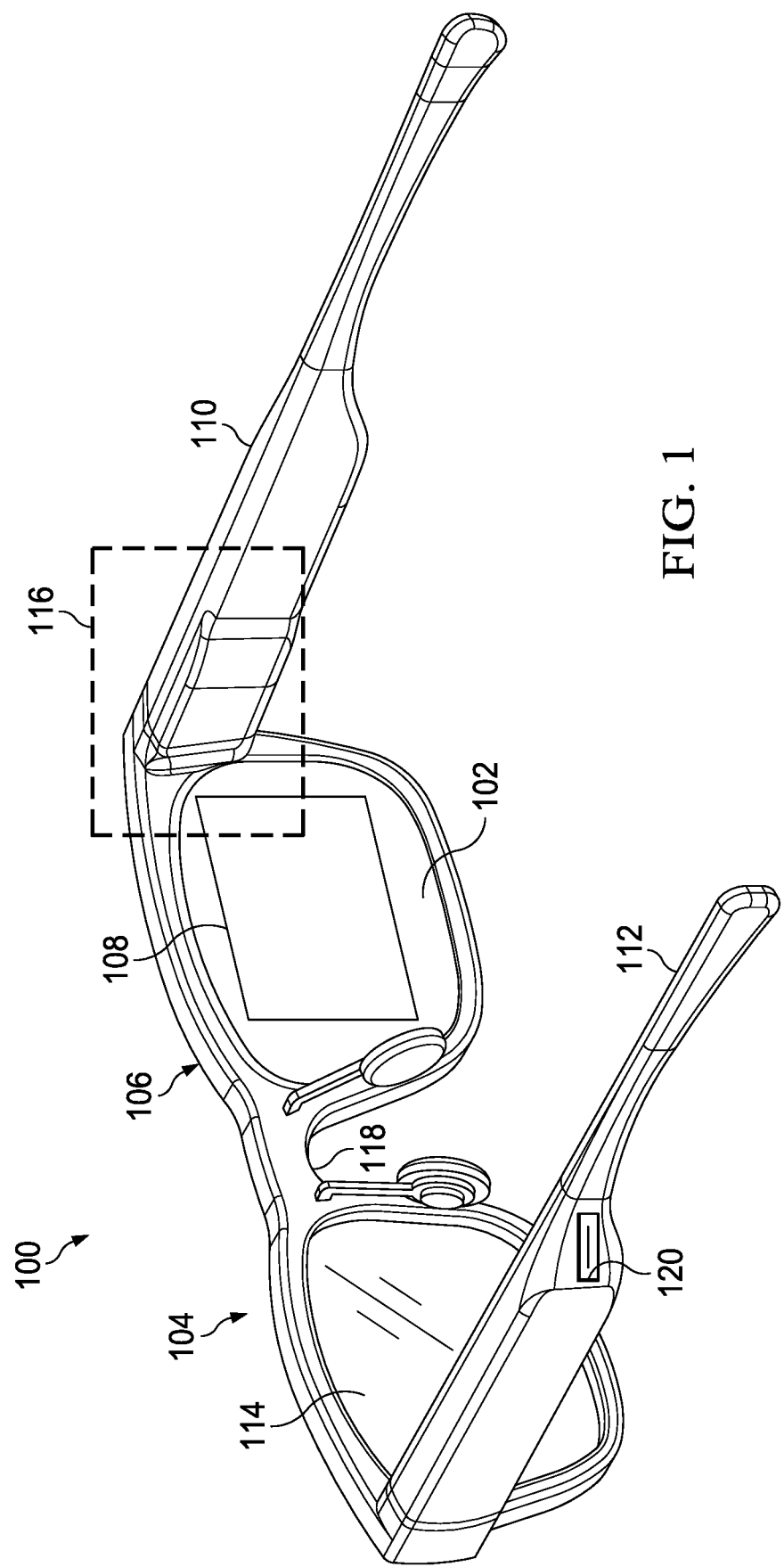
FIG. 1 shows an example head-mounted display (HMD) employing an optical combiner at which images projected by the HMD are displayed in accordance with some embodiments.

In order to demonstrate an HMD with AR or MR capabilities to potential users, a demonstration model is typically employed to allow a variety of potential users to try on the HMD and experience the features and functions of the product, such as, but not limited to, a heads-up display, eye-tracking, software experiences, and electrochromic tints. This can present challenges for those potential users that require prescription vision correction as most demonstration HMDs are configured and calibrated for users with good visual acuity (i.e., users not requiring vision correction). In some cases, a potential user wearing prescription eyeglasses may be able to fit a demonstration HMD over their eyeglasses so that light from the demonstration HMD and the environment is corrected by the eyeglass lenses configured with the user's prescription, allowing them to see the HMD display and their environment clearly.

However, some potential users may not be able to fit both their prescription eyeglasses and a demonstration HMD comfortably in front of their eyes due to, for example, facial geometry, head size, and/or the size and geometry of their eyeglasses. Furthermore, as corrective eyeglasses are bespoke, it is impractical to provide demonstration HMDs with integrated prescription correction specific to each potential user. In addition, some HMDs only project images to one combiner, such as the right eye combiner. For potential users who may have compromised vision or are lacking vision in the eye to which the demonstration HMD is configured to project, it is desirable that they be able to view the display with their other eye.

Thus, it is desirable to provide an intermediary viewing device that allows a potential user requiring vision correction to comfortably view the display of a demonstration HMD, along with the view of their environment seen through the HMD, while wearing their prescription eyeglasses and that also allows users to view the display of a demonstration HMD with either eye or both eyes.

Another concern in having a demonstration HMD that will be handled by many potential users is adequately cleaning and sanitizing the device between users. As the HMD contains electrical components and potentially delicate films or surface features on the combiner(s), cleaning may need to be done carefully so as not to interfere with or damage these components. Further, frequent cleanings are likely to reduce the usable life of the demonstration HMD. Thus, it is also desirable to provide a rugged intermediary viewing device that minimizes a user's contact with the demonstration HMD and, which itself, is easy to clean and sanitize.

FIGS. 1-7 illustrate systems and methods of relaying light projected by an HMD, along with light from the environment, to a user. A viewing device, onto which an HMD can be placed, includes at least one optical relay unit to convey light projected by the HMD, and focused at the eyebox of the HMD, to a user's eye(s) such that the user views both the projected light and the environment viewed through the HMD with good visual acuity. The viewing device is configured to hold the HMD at a distance away from the user such that the temple arms of the device do not come in contact with the user or their eyeglasses if they are wearing any. In a monocular embodiment, this allows a user to position a viewing aperture located on the eye-facing surface of the optical relay unit in close proximity to either of their eyes and view the display, irrespective of which combiner the HMD is configured to project content. In a binocular embodiment, this allows the user to position their eyes in front of both viewing apertures located on the eye-facing surface of the optical relay unit.

FIG. 1 illustrates an example HMD 100 employing an optical combiner 102 through which images projected by the HMD are displayed. The HMD 100 has a support structure 104 that includes a frame 106, which houses a micro-display, such as a laser projector or light-emitting diode (LED) display, that generates visible light in order to project images toward the eye of a user via the optical combiner 102, such that the user perceives the projected images as being displayed in a field of view (FOV) area 108 through the combiner 102. In some embodiments, the micro-display also generates infrared light for eye tracking purposes.

Support structure 104 also includes components to allow the support structure 104 to be worn in a position in front of a user's eyes. Examples of such components are arms 110 and 112 to be supported by a user's ears. A strap, or straps (not shown), configured to be worn around and/or on top of a user's head may be used in place of one or more of the arms in some embodiments to secure the support structure 104 in front of a user's eyes. In some embodiments, the HMD 100 is symmetrically configured as a binocular display such that lens element 114 is also a combiner and a micro-display is housed in the portion of the frame 106 proximate to arm 112 to project images to a FOV area within lens element 114. Frame 106 also includes a nose bridge 118 disposed between combiner 102 and lens elements 114. The nose bridge 118 is configured to allow the frame 106 to be partially supported on a user's face by their nose or supported on a viewing device, such as described below with reference to FIG. 2.

In the depicted example, the HMD 100 is a near-eye display system in which the support structure 104 is configured to be worn on the head of a user and has a general shape and appearance (or "form factor") of an eyeglasses frame. The support structure 104 contains or otherwise includes various components to facilitate the projection of such images toward the eye of the user, such as a processing system (not shown). In some embodiments, the support structure 104 further includes various sensors, such as one or more front-facing cameras, rear-facing cameras, other light sensors, motion sensors, accelerometers, and the like. The support structure 104 further can include one or more connection interfaces, such as connection interface 120, as well as radio frequency (RF) interfaces or other wireless interfaces, such as a Bluetooth™ interface, a WiFi interface, and the like. Further, in some embodiments, the support structure 104 includes one or more batteries or other portable power sources for supplying power to the electrical and processing components, such as one or more processors of a processing system of the HMD 100. In some embodiments, some or all of these components of the HMD 100 are fully or partially contained within an inner volume of support structure 104, such as within arm 110 and the portion of the frame 106 in region 116 of the support structure 104. It should be noted that while an example form factor is depicted, it will be appreciated that in other embodiments the HMD 100 may have a different shape and appearance from the eyeglasses frame depicted in FIG. 1.

In the depicted embodiment, combiner 102 of the HMD 100 provides an AR display in which rendered graphical content can be superimposed over or otherwise provided in conjunction with a real-world view as viewed by the user through combiner 102. For example, light used to form a perceptible image or series of images may be projected by a micro-display of the HMD 100 to an eyebox (shown in FIG. 4) via a series of optical elements, such as a lightguide formed at least partially in combiner 102 and one or more lenses and/or filters disposed between the micro-display and the lightguide. Optical combiner 102 includes at least a portion of a lightguide that routes display light received by an incoupler of the lightguide to an outcoupler of the lightguide, which outputs the display light toward an eye of a user of the HMD 100. In addition, optical combiner 102 is sufficiently transparent to allow a user to see through combiner 102 to provide a field of view of the user's real-world environment such that the image appears superimposed over at least a portion of the user's real-world environment.

As described further below, in some embodiments the HMD 100 is configured to be augmented with a viewing device that includes an optical relay unit to convey light projected by the HMD, and focused at the eyebox of the HMD, to a user's eye. This configuration allows the user to view both the projected light and the environment viewed through the HMD with good visual acuity. The viewing device is configured to hold the HMD at a distance away from the user such that the temple arms of the device do not come in contact with the user or their eyeglasses.

Figure 2:
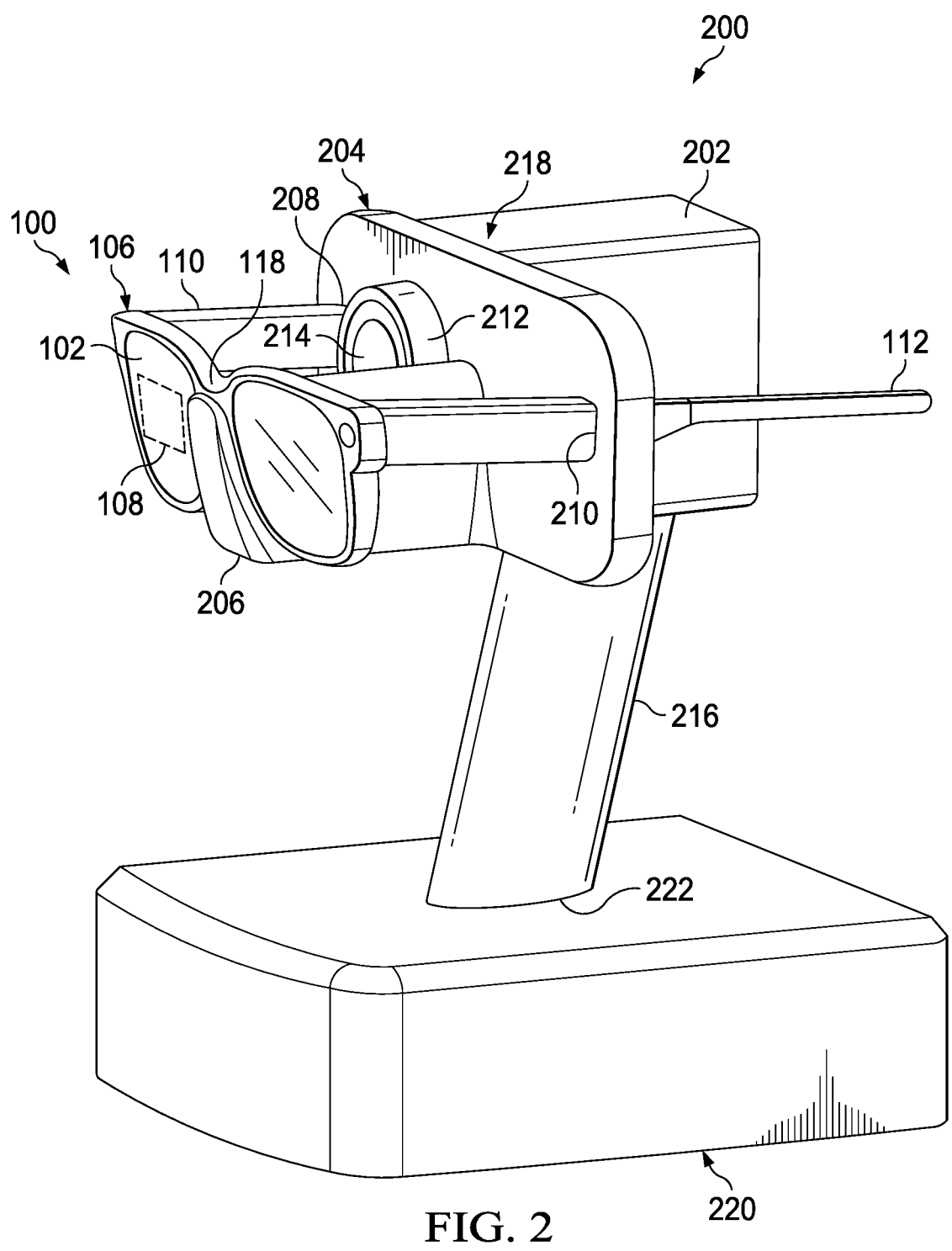
FIG. 2 shows a front perspective view of an embodiment of a viewing device having an optical relay unit configured to transmit light from an HMD, such as the HMD shown in FIG. 1, to an eye-facing aperture in accordance with some embodiments.

FIG. 2 shows a front perspective view of a viewing device 200 having an optical relay unit 202 configured to transmit light from an HMD, such as HMD 100 shown in FIG. 1, to an eye-facing aperture (shown in FIG. 3) such that a user looking through the eye-facing aperture can see content projected at the FOV 108 of the HMD 100. The viewing device 200 includes a holder 204 coupled to a world-facing surface 218 (obscured by the holder in FIG. 2) of the optical relay unit 202 in order to partially support the frame 106 of HMD 100 via a protrusion 206 generally having a shape and size to accommodate the nose bridge 118 area of the frame 106. In some embodiments, protrusion 206 includes an indentation in which the nose bridge 118 of the frame 106 rests, thus preventing the frame 106 from moving horizontally along the protrusion 206, either towards or away from the holder 204. The frame 106 is further supported on the holder 204 by two slots 208, 210 having a shape and size to accommodate arms 110 and 112 of the frame 106 therein. An opening 212 is provided on at least one side of the holder 204 such that the opening 212 is aligned with a world-facing aperture 214 of the optical relay unit 202. The opening 212 and world-facing aperture 214 are aligned with the FOV 108 of combiner 102 when the HMD 100 is supported by the holder 204. In some embodiments, the holder 204 is configured to be opaque so as to block the view of the HMD 100 mounted thereto in order to allow the user to focus on the images conveyed via the eye-facing aperture.

Figure 3:
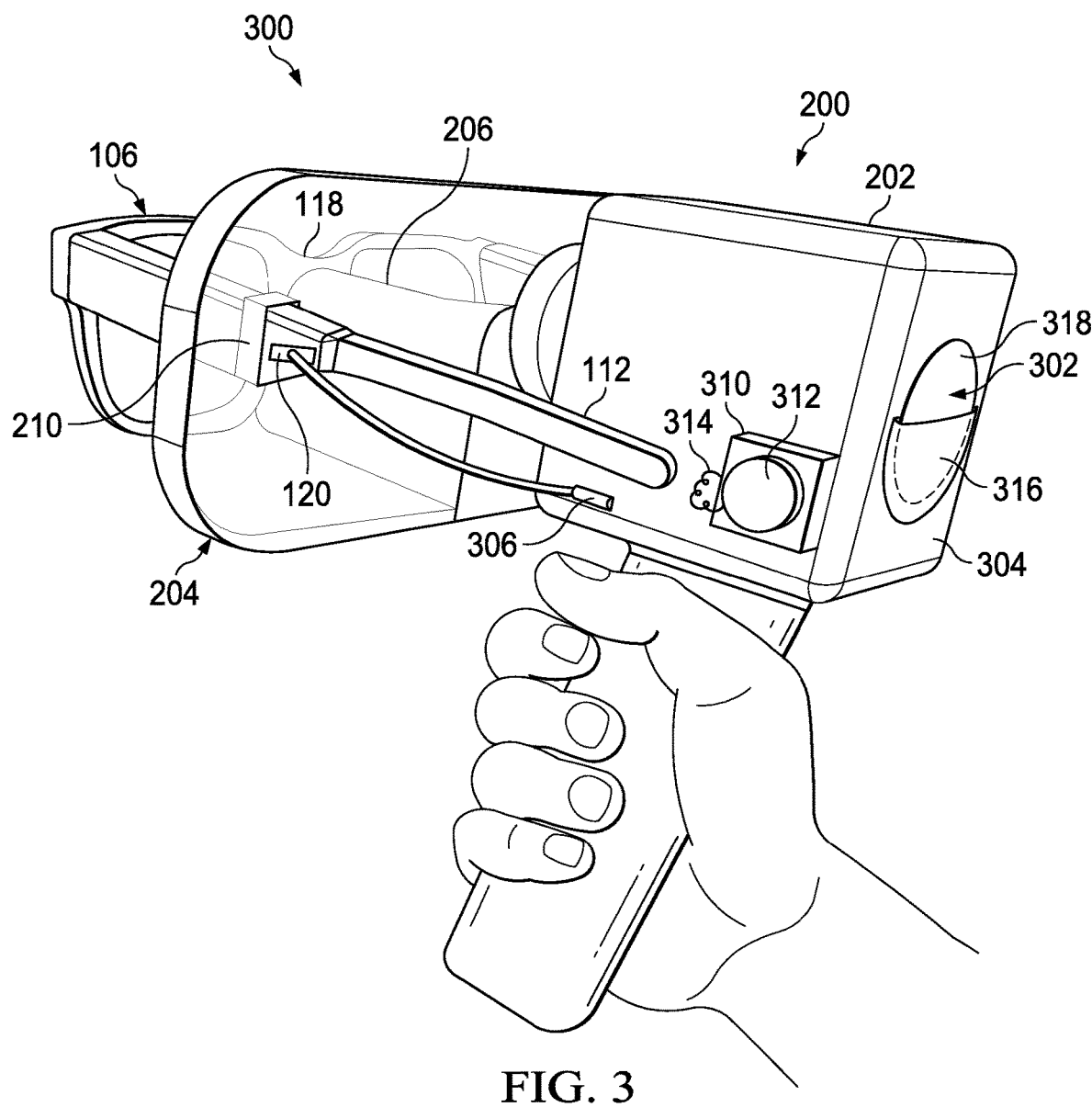
FIG. 3 shows a rear perspective view of the viewing device of FIG. 2 supporting an HMD in accordance with some embodiments.

In some embodiments, the viewing device 200 has a handle 216 mounted to a lower surface 218 of the optical relay unit 202. The handle 216 is configured to have a shape and size that allows a user to hold the viewing device 200 with one hand (as shown in FIG. 3). In some embodiments, the handle 216 is also configured to have a shape and size similar to a mounting slot 222 in a base 220 so that the handle 216 can be inserted into the base 220 in an upright position and held securely so as not to tip over. In some embodiments, handle 216 includes a user input interface (not shown) in communication with the associated HMD 100 and configured to allow a user to navigate the display interface and select and/or trigger events on the HMD 100 in order to replicate the user experience of wearing the HMD 100.

As described further below, the viewing device 200 is configured to replicate an "eyebox" of HMD 100 so that a user's pupil can more easily be positioned in the eyebox of HMD 100 in order to clearly see the images projected by the HMD 100. The eyebox of an HMD is generally a three-dimensional (3D) volume in space in which a user's eye must be positioned in order to see the virtual image projected by the HMD with good visual acuity. The eyebox of an HMD is typically very close to the combiner/lens, making it difficult for a user wearing prescription eyeglasses to position their eye within the eyebox. Thus, the viewing device 200 includes the optical relay unit 202 to convey the light from the HMD 100 in order to replicate the eyebox of the HMD 100 at a location nearer to the user's pupil positioned near an eye-facing aperture of the viewing device 200 and to ensure the user views the image as right-side-up, as described in greater detail with reference to FIGS. 3-7.

FIG. 3 shows a rear perspective view 300 of the viewing device 200 of FIG. 2 supporting HMD 100. Arm 112 of HMD 100 is inserted through slot 210 of holder 204 and, though not visible in FIG. 3, arm 110 is inserted through slot 208 on the opposite side of holder 204. The nose bridge area 118 of frame 106 is supported by protrusion 206. An eye-facing aperture 302 is disposed on the eye-facing surface 304 of the optical relay unit 202. The eye-facing aperture 302 is configured to be placed in front of, and in close proximity to, a user's eye so that the user can see light from the HMD 100 and environment that are transmitted to the eye-facing aperture 302 via the optical relay unit 202.

In some embodiments, the viewing device 200 includes a connection port 306 that is configured to be coupled to the connection port 120 of HMD 100 by, for example, a Universal Serial Bus (USB) connector. The connection ports 306 and 120 allow data to be communicated from the viewing device 200 to the HMD 100 or visa versa. Further, in some embodiments, a battery (not shown) is housed within the viewing device 200, for example, in the handle 216, and coupled to the connection port 306 such that the HMD 100 receives electricity from the battery to operate and/or to charge the on-board battery (not shown) of the HMD 100 when connected to the viewing device 200 via the connection port 306. In some embodiments, the viewing device 200 includes components that act as a heat sink in order to cool components of the viewing device 200 to increase efficiency and the run-time of the viewing device 200 and connected HMD 100.

In order to allow a user to provide input to control the HMD 100, for example, to select display options or open applications available on the HMD 100, a controller 312 can be communicatively coupled to the HMD 100 via various means, such as, for example, via a Bluetooth™ interface. In some cases, controller 312 is configured as a wearable device, such as a ring or bracelet. In a retail environment where multiple HMDs 100 are being demonstrated and where users are likely to misplace or forget they are wearing controller 312, it is desirable that each controller 312 configured to control a particular HMD 100 is easily associated with its respective HMD 100 and, in some cases, tethered to the viewing device 200 of its respective HMD 100. In some embodiments, the viewing device 200 includes a mount 310 configured to hold a controller 312 for the HMD 100 and a tether 314 to secure the controller 312 to the viewing device 200 so that it is not misplaced or taken by a user.

In addition to use in a retail demonstration environment, the viewing device 200 can be used during the manufacturing process to allow quality control checks and calibration of the HMD 100. In some cases, an HMD 100 may be manufactured to have a combiner with an integrated corrective prescription specific to an intended user. Thus, in order for a technician who does not require vision correction, or who does not have the same prescription as the intended user, to view the display at the combiner with good visual acuity, the changes imparted on the light by the intended user's corrective prescription need to be reversed. This can be accomplished by including lenses in the optical path from the HMD 100 to the technician's eye in order to reverse an integrated prescription of the HMD 100. In some embodiments, the optical relay unit 202 includes a holder 316, proximate to the eye-side aperture 302, that is configured to hold at least one lens 318 in the optical path between the eye-side aperture 302 and a user's eye. The at least one lens 318 can include ophthalmic trial lenses, such as, for example, spherical and cylinder lenses used to change the focal point of light entering the user's eye such that the light is correctly focused on the retina, allowing the user to view their environment in focus.

Figure 4:
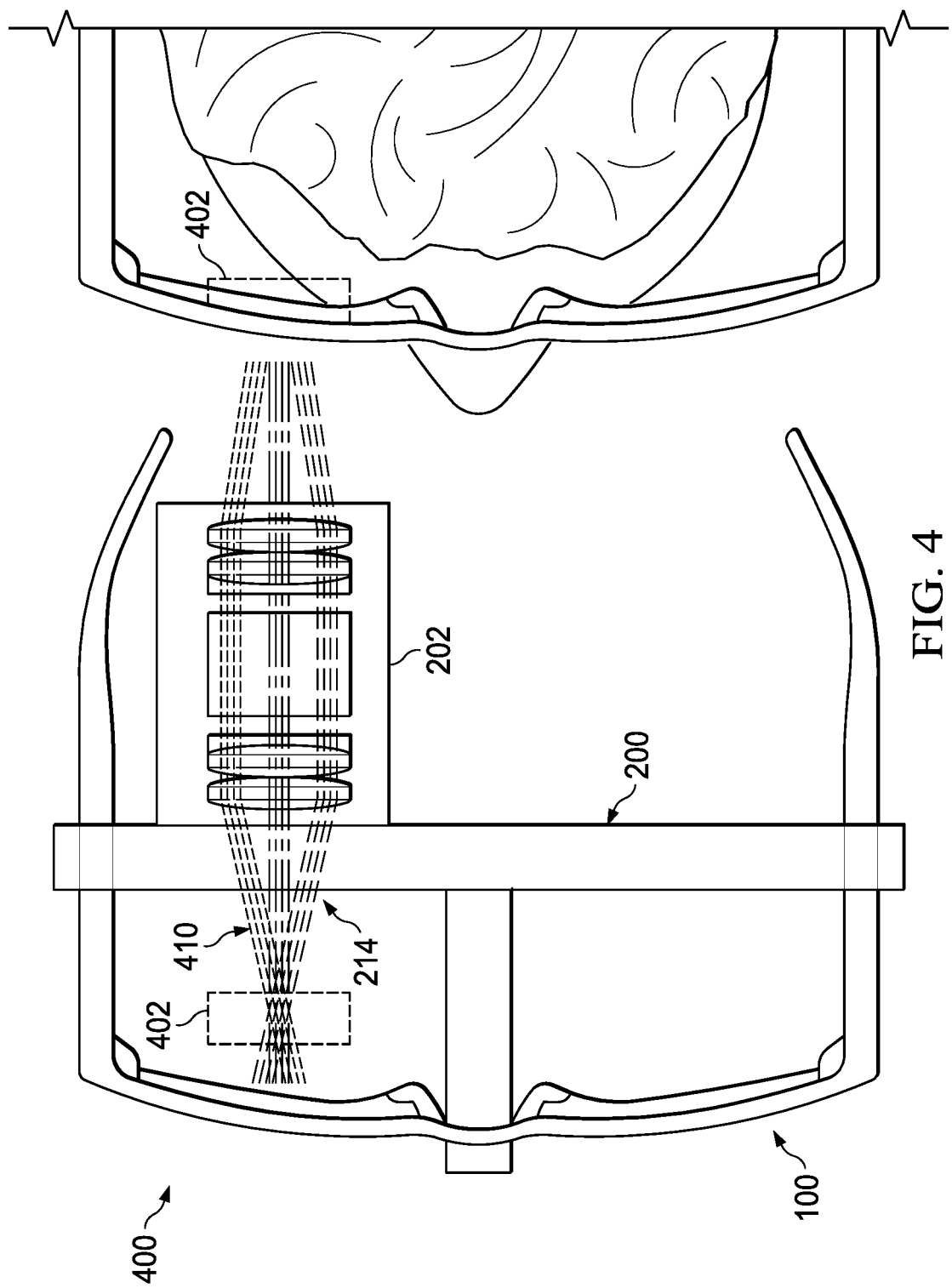
FIG. 4 is a top view of the viewing device illustrating replicating an eyebox of an HMD by the viewing device in accordance with some embodiments.

FIG. 4 is a top view 400 of the viewing device 200 illustrating replication of an eyebox 402 of the HMD 100 by the viewing device 200. The eyebox 402 of HMD 100 is generally a three dimensional (3D) volume in space within which the pupil of a user's eye must be positioned in order to satisfy a series of viewing experience criteria, such as, for example, that the user can see the edges of a virtual image projected by the HMD 100 and that the user can see the virtual image with good visual acuity. As many factors affect the size and shape of an eyebox, it is rarely a rectangle or box-shaped, but rather an anisotropic volume. The eyebox of an HMD is typically located very close to the combiner/lens (~20 mm), making it difficult for a user wearing prescription eyeglasses to position their eye within the eyebox. Thus, the viewing device 200 is configured to replicate the eyebox 402 of HMD 100 at a location that is closer to the user so that a user's pupil can more easily be positioned in the eyebox 402 in order to clearly see the images projected by the HMD 100.

However, because the world-facing aperture 214 of the viewing device 200 is not located at the eyebox 402 of the HMD 100, the images of both the display and real-world may be inverted on initial entry into the viewing device 200, which requires additional optical elements to invert the images at least once such that they appear correct (i.e., right-side-up) to the user. In order for a potential user to view the image right-side-up, the optical relay unit 202 includes components to invert the images to their original orientation (i.e., right-side-up), as described in greater detail below with reference to FIGS. 5-7. Thus, the viewing device 200 is configured to hold HMD 100 at a distance away from the user such that the temple arms of the device do not come in contact with the user or their eyeglasses if they are wearing any. This allows a user to position the eye-facing aperture 302 of the optical relay unit 202 in close proximity to either of their eyes and view the display in focus and right-side up.

Figure 5:
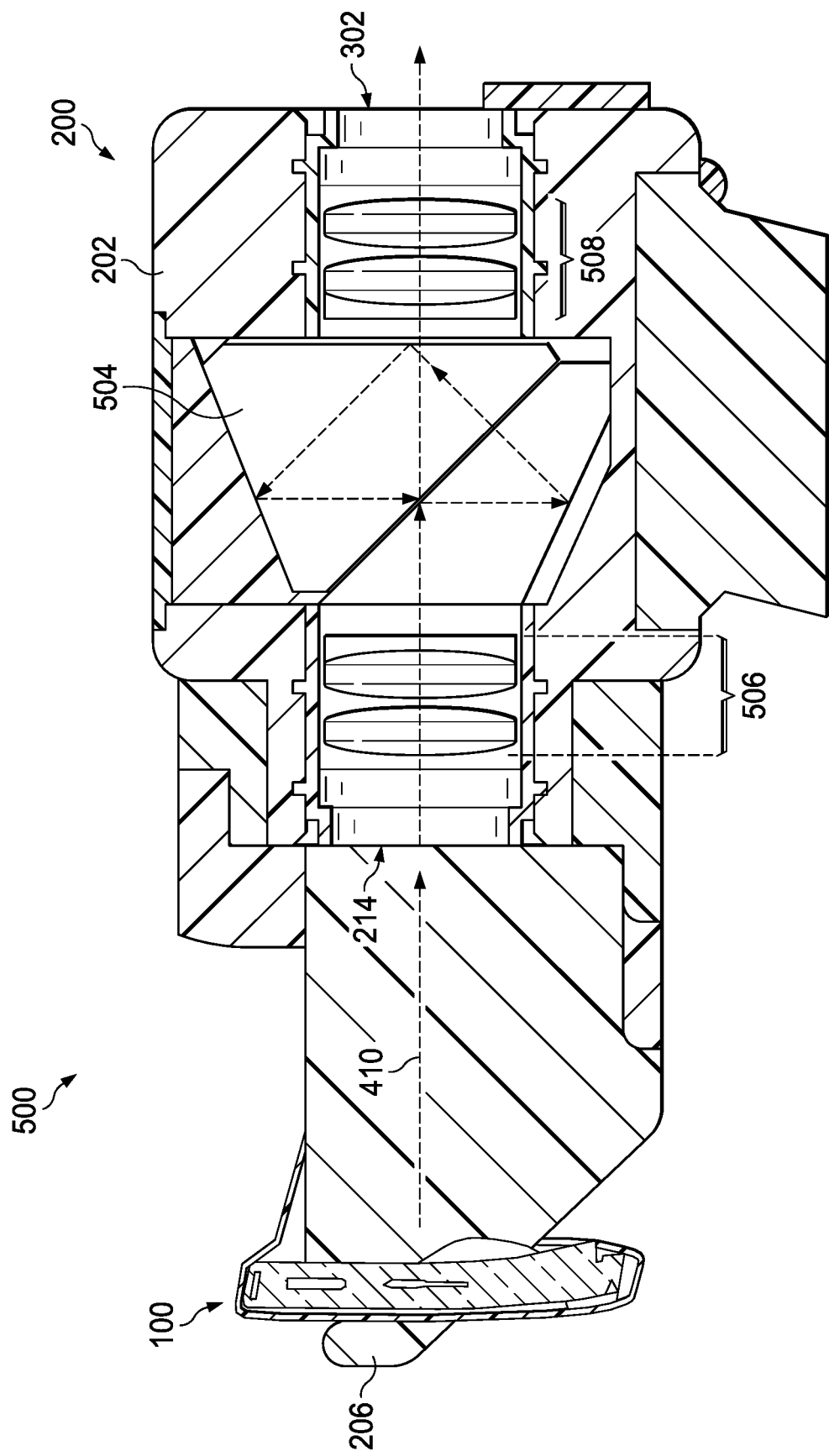
FIG. 5 is a cross-section of an embodiment of the viewing device with an optical relay unit employing a compound prism in accordance with some embodiments.

FIG. 5 is a cross-section 500 of an embodiment of viewing device 200 with optical relay unit 202 employing a compound prism 504, such as, for example, a Schmidt-Pechan prism. The optical relay unit 202 includes a first lens set 506 proximate to the world-facing aperture 214 within an optical path of light 410 projected from HMD 100. The optical relay unit 202 also includes a second lens set 508 proximate to the eye-facing aperture 302. Between the first lens set 506 and the second lens set 508 is the compound prism 504 disposed in the optical path between the world-facing aperture 214 and the eye-facing aperture 302. In some embodiments, the first and second lens sets 506, 508 include at least one double convex lens configured to converge beams of light 410 received through the world-facing aperture 214. The beams of light 410 include both light projected from the HMD and light from the environment that has traveled through combiner 102 of the HMD. In some embodiments, the first and second lens sets 506, 508 also include at least one achromatic lens to minimize the effects of chromatic and spherical aberration of the light 410 as it is conveyed through the optical relay unit 202 to a user's eye. The compound prism 504 functions to invert the image represented by the beams of light 510 by 180°, thus acting as an image rotator so that the image viewed by the user is right-side up (i.e., not upside-down).

Figure 6:
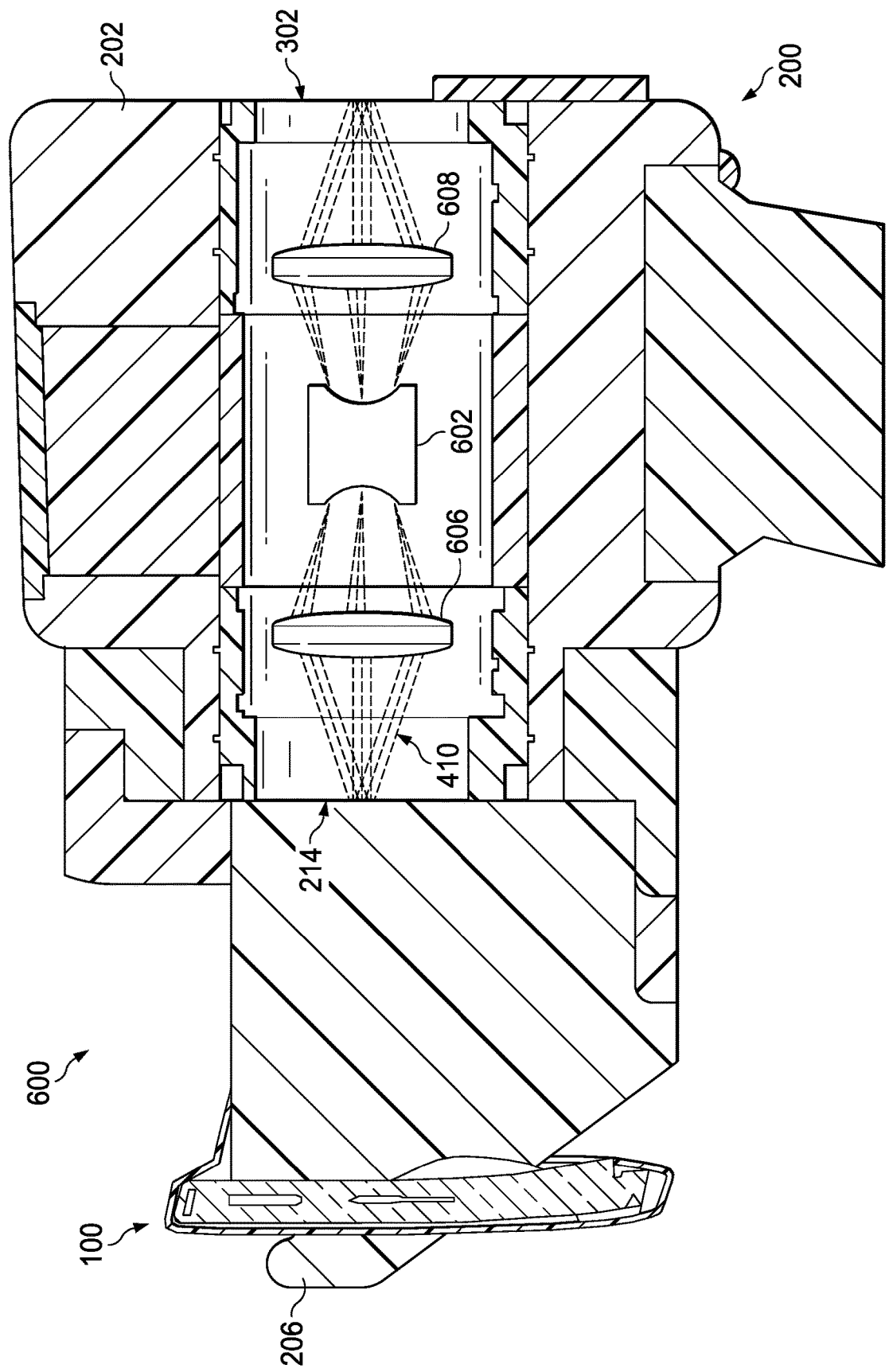
FIG. 6 is a cross-section of an embodiment of the viewing device with an optical relay unit employing a fiber inverter in accordance with some embodiments.

FIG. 6 is a cross-section 600 of an embodiment of viewing device 200 with optical relay unit 202 employing a fiber inverter 602. The optical relay unit 202 includes a first lens 606 proximate to the world-facing aperture 214 within an optical path of light projected from HMD 100. The optical relay unit 202 also includes a second lens 608 proximate to the eye-facing aperture 302. The fiber inverter 602 is disposed between the first lens 606 and the second lens 608 in the optical path between the world-facing aperture 214 and the eye-facing aperture 302. The fiber inverter 602 is made of either glass or polymer fibers fused together to form a solid mass and with one end twisted 180° relative to the other end. These fibers act like pipes that transfer light and images from one end of the "pipe" to the other and also act as a light homogenizer to provide near constant optical intensity over a specified area. The twisting of the fibers in the fiber inverter 602 results in a 180° rotation of the image conveyed through the fiber inverter 602. Thus, the fiber inverter 602 acts in a similar manner to the compound prism 504 described above to invert the image represented by the beams of light 410 transmitted by the first lens 606 by 180° so that the image viewed by the user is right-side up.

Figure 7:
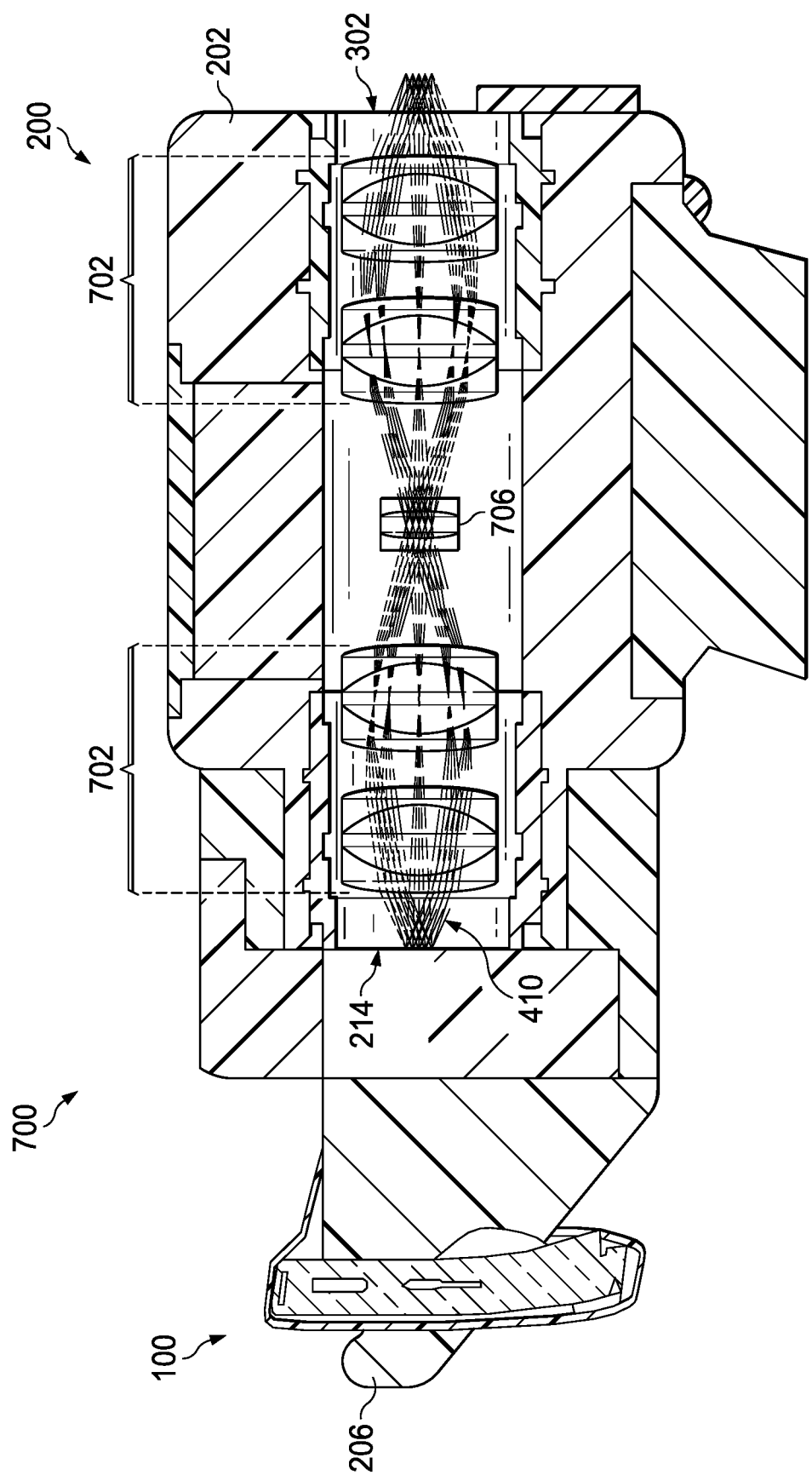
FIG. 7 is a cross-section of an embodiment of the viewing device with an optical relay unit employing a plurality of triplet lenses and a Steinheil triplet lens in accordance with some embodiments.

FIG. 7 is a cross-section 700 of an embodiment of viewing device 200 with optical relay unit 202 employing at least a first set of triplet lenses 702, a second set of triplet lenses 704, and a Steinheil triplet lens 706. Each of the first set of triplet lenses 702, the second set of triplet lenses 704, and the Steinheil triplet lens 706 are achromatic lenses to minimize the effects of chromatic and spherical aberration of light 410 as it is conveyed through the optical relay unit 202 to a user's eye. The first set of triplet lenses 702 are disposed proximate to the world-facing aperture 214 within an optical path of light projected from HMD 100. The second set of triplet lenses 704 are disposed proximate to the eye-facing aperture 302. The Steinheil triplet lens 706 is positioned between the first set of triplet lenses 702 and the second set of triplet lenses 704 so as to be disposed in the optical path between the world-facing aperture 214 and the eye-facing aperture 302. The combination of the first set of triplet lenses 702, the second set of triplet lenses 704, and the Steinheil triplet lens 706 act to impart 180° rotation of the image conveyed through the world-facing aperture 214. Thus, the combination of the first set of triplet lenses 702, the second set of triplet lenses 704, and the Steinheil triplet lens 706 act in a similar manner to the compound prism 504 described above to invert the image represented by the beams of light 410 transmitted into the optical relay unit 202 by 180° so that the image viewed by the user is right-side up.

Thus, the viewing device 200, via various configurations of the optical relay unit 202 allows various potential users to view both the projected light and the environment viewed through the HMD 100 with good visual acuity while minimizing user contact with the HMD 100. The viewing device 200 is configured to hold the HMD at a distance away from the user such that the temple arms of the device do not come in contact with the user or their eyeglasses if they are wearing any. This allows a user to position the eye-facing aperture 302 of the optical relay unit 202 in close proximity to either of their eyes and view the display, irrespective of which combiner the HMD 100 is configured to project content.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A device comprising:
   an optical relay unit having a world-facing surface and an eye-facing surface; and
   a holder coupled to the optical relay unit and configured to support a head-mounted display (HMD) device proximate to the world-facing surface of the optical relay unit;
   wherein the optical relay unit is configured to transmit light projected by the HMD device to a user's eye via an eye-facing aperture disposed at the eye-facing surface of the optical relay unit.

2. The device of claim 1, wherein the optical relay unit comprises a compound prism.

3. The device of claim 2, wherein the optical relay unit further comprises a first lens set and a second lens set, and wherein the compound prism is disposed between the first lens set and the second lens set.

4. The device of claim 1, wherein the optical relay unit comprises a fiber inverter.

5. The device of claim 4, wherein the optical relay unit further comprises a first lens and a second lens, and wherein the fiber inverter is disposed between the first lens and the second lens.

6. The device of claim 1, wherein the optical relay unit comprises a Steinheil triplet lens disposed between a first set of triplet lenses and a second set of triplet lenses.

7. The device of claim 1, further comprising:
   a connection port configured to electrically couple the device to a connection port of the HMD device via a connector.

8. The device of claim 1, further comprising:
   a mount configured to receive a controller associated with the HMD device.

9. A system comprising:
   a head-mounted display (HMD) device configured to project digital images to a user's eye; and
   a viewing device comprising:
      an optical relay unit having a world-facing surface and an eye-facing surface; and
      a holder coupled to the optical relay unit and configured to support the HMD device proximate to the world-facing surface of the optical relay unit;
      wherein the optical relay unit is configured to transmit light projected by the HMD device to the user's eye via an eye-facing aperture disposed at the eye-facing surface of the optical relay unit.

10. The system of claim 9, wherein the optical relay unit comprises a compound prism.

11. The system of claim 10, wherein the optical relay unit further comprises a first lens set and a second lens set, and wherein the compound prism is disposed between the first lens set and the second lens set.

12. The system of claim 9, wherein the optical relay unit comprises a fiber inverter.

13. The system of claim 12, wherein the optical relay unit further comprises a first lens and a second lens, and wherein the fiber inverter is disposed between the first lens and the second lens.

14. The system of claim 9, wherein the optical relay unit comprises a Steinheil triplet lens disposed between a first set of triplet lenses and a second set of triplet lenses.

15. The system of claim 9, further comprising:
   a connection port configured to couple the viewing device to a connection port of the HMD device via a connector.

16. The system of claim 9, further comprising:
   a mount configured to receive a controller associated with the HMD device.

17. A method of shifting an eyebox of a head-mounted display (HMD):
   receiving light projected from an optical combiner of the HMD at a world-facing aperture of a viewing device;
   transmitting the light through an optical relay unit of the viewing device to an eye-facing aperture of the optical relay unit; and
   outputting the light from the eye-facing aperture such that the light is focused at an eyebox in which a user's eye is located.

18. The method of claim 17, wherein the optical relay unit comprises a compound prism disposed between a first lens set and a second lens set within an optical path between the eye-facing aperture and the world-facing aperture.

19. The method of claim 17, wherein the optical relay unit comprises a fiber inverter disposed between a first lens and a second lens within an optical path between the eye-facing aperture and the world-facing aperture.

20. The method of claim 17, wherein the optical relay unit comprises a Steinheil triplet lens disposed between a first set of triplet lenses and a second set of triplet lenses within an optical path between the eye-facing aperture and the world-facing aperture.

* * * * *